United States Patent [19]
Pompon

[11] 3,979,222
[45] Sept. 7, 1976

[54] METHOD AND DEVICE FOR CONNECTING ELEMENTS OF A FORCED FLOW ELECTROCHEMICAL STORAGE CELL

[75] Inventor: Jean-Paul Pompon, Vitry-sur-Seine, France

[73] Assignee: Compagnie Generale d'Electricite, Paris Cedex, France

[22] Filed: Mar. 19, 1975

[21] Appl. No.: 559,948

[30] Foreign Application Priority Data
Apr. 5, 1974  France .............................. 74.12152

[52] U.S. Cl. ................................. 429/81; 429/51; 429/124
[51] Int. Cl.² .......................................... H01M 10/00
[58] Field of Search.... 136/83 R, 6, 86 A, 159–162, 136/30

[56] References Cited
UNITED STATES PATENTS

| | | |
|---|---|---|
| 2,615,931 | 10/1952 | Hatfield .......................... 136/86 A |
| 3,247,024 | 4/1966 | Tamminen ...................... 136/160 X |
| 3,359,136 | 12/1967 | Merten et al. ..................... 136/30 X |
| 3,497,388 | 2/1970 | Weissman ........................ 136/83 R |
| 3,505,113 | 4/1970 | Merten et al. ..................... 136/30 X |
| 3,576,679 | 4/1971 | Shipps ............................. 136/6 F X |
| 3,809,578 | 5/1974 | Symons ............................ 136/6 E |

Primary Examiner—John H. Mack
Assistant Examiner—C. F. Lefevour
Attorney, Agent, or Firm—Sughrue, Rothwell, Mion, Zinn and Macpeak

[57] ABSTRACT

An electrochemical storage cell is formed by connecting up elements in hydraulic and electric series and, in each of the elements, in electrically insulating the inside of the negative end fitting situated hydraulically the nearest to the following element. In this way, the interference transfer of charges resulting from the electric series connection of two neighbouring elements can be effected only by ionic conduction in the electrolyte flowing between the two elements. The invention is used in air-zinc cells.

5 Claims, 1 Drawing Figure

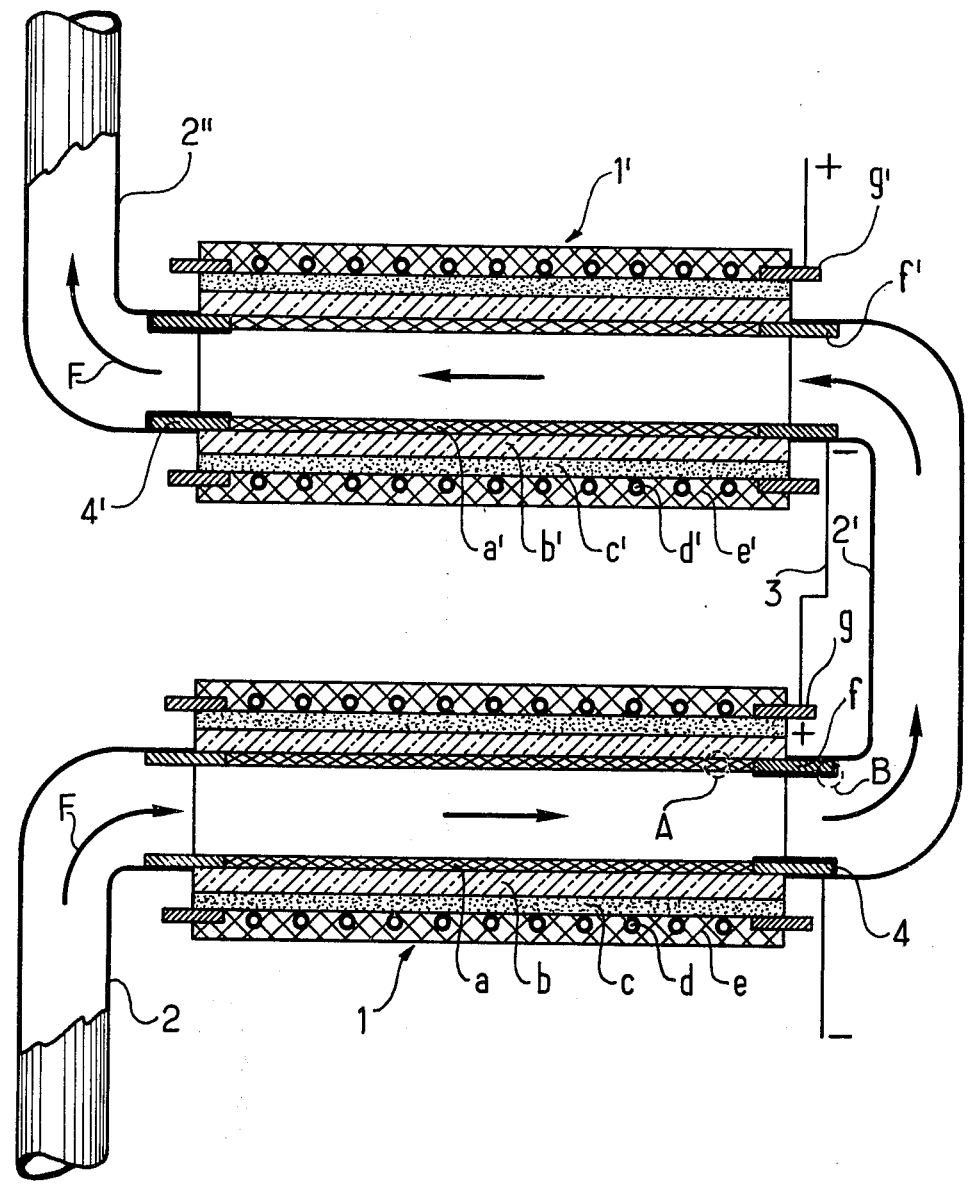

METHOD AND DEVICE FOR CONNECTING ELEMENTS OF A FORCED FLOW ELECTROCHEMICAL STORAGE CELL

BACKGROUND OF THE INVENTION

The present invention has as its object a method enabling the connecting of the elements of a forced flow electrochemical cell of the type implementing an electrode of the first kind, namely, a metal suitable for supplying, on discharge, a compound soluble in the electrolyte.

It also concerns a device for implementing such a method.

Forced flow electrochemical cells are well-known and are, at present, undergoing numerous research operations with a view to equipping non-polluting vehicles.

Among these cells using an electrode called an electrode of the first kind, air-zinc systems offer encouraging prospects with a view to such an application.

It is stated briefly for reference that an element of such a cell comprises, more particularly, a catalytic active part suitable, more particularly, for electrochemically reducing oxygen in air, a separator permeable to ions on whose level an alkaline solution containing zinc powder in suspension flows; the electrochemical process consists in the oxydation of the zinc by air with the appearance of an electromotive force.

With a view to producing a cell, it is therefore necessary to couple electrically and hydraulically such elements together.

One method of coupling consists in feeding the elements in series with the alkaline solution and in connecting these same electrically in series.

In this way, sets of elements or modules comprising a limited number of elements is formed and it is, of course, possible to couple such modules together with a view to producing a cell having predetermined rated characteristics.

The hydraulic coupling of the elements in series is ensured between two neighbouring elements by means of a tube or conduit made of an insulating substance.

If effected without any particular precautions, such a hydraulic coupling method has a serious disadvantage, as will be explained in detail in the descriptive part of the present invention.

SUMMARY OF THE INVENTION

The invention therefor has as its object a method for connecting elements of an electrochemical cell, of the type in which an electrolyte, comprising, in suspension, a metal suitable for supplying, on discharge, a compound soluble in the said electrolyte, is made to flow within the said elements, each comprising more particularly a catalytic active layer, a negative collector grid as well as a positive collector grid, the said grids each being extended on either side and electrically connected to end fittings, that method consisting in:

hydraulically feeding the said elements, in series with, the said electrolyte comprising the said metal in suspension;

the said elements are electrically connected together in series; characterized in that in each of the elements, the inside of the negative end fitting situated hydraulically the nearest to the following element and having a higher potential is at least partly insulated electrically, so that the interference transfer of charges coming from the connecting up in series of two elements can be effected only by ionic conduction in the electrolyte vein flowing between the two elements.

It also relates to a device for implementing the said method.

BRIEF DESCRIPTION OF THE DRAWING

Other characteristics and advantages of the invention will become apparent from the following description, given by way of a purely illustrating example having no limiting character, with reference to the single accompanying figure.

DESCRIPTION OF THE PREFERRED EMBODIMENT

The accompanying figure therefore illustrates two elements 1 and 1' which are substantially identical to each other, fed, in series, with a potassium hydroxyde solution containing zinc powder in suspension, such feeding being effected through electrically insulating pipes 2, 2', 2'' and being materially shown by the arrows F.

Such elements are, for example, of the type described by the applicant in his French Pat. No. 71,45,734 of Dec. 20, 1971 now issued under U.S. Pat. No. 2,173,637, corresponding to British Pat. No. 58 186/72 of Dec. 15, 1972 now issued under U.S. Pat. No. 1,404,990 and in the French applications for additions U.S. Pat. No. 72 229 61 of June 26, 1972 now issued under U.S. Pat. No. 2,196,284 and No. 73 14765 of Apr. 24, 1973 now issued under U.S. Pat. No. 2,227,651 for a "Forced flow electrochemical cell".

It should be mentioned for reference on that subject that each of the said elements, for example the element 1, comprises a negative cllector grid $a$, a porous separator $b$, a porous catalytic active layer $c$, a positive collector grid $d$ coated in a porous water-repellent layer $e$. Moreover, conductive end fittings or terminals such as $f$ and $g$, connected to the negative and positive collector grids $a$ and $d$ respectively ensure the electric and hydraulic connection of the elements together.

The element 1' comprises, of course, the same parts referenced by the same latters but bearing the "prime" index.

In the elements 1 and 1' the oxydation of the zinc by the outside air at the level of the catalytic layers $c$ and $c'$ generates an electromotive force collected betwen the end fittings $f$ and $g$ on the one hand and $f'$ and $g'$ on the other hand.

The said elements are connected in electrical series by means of a conductor wire 3 consequently connecting together the end fittings $g$ and $f'$ of the elements 1 and 1', respectively.

It will therefore be seen that the electric circuit formed successively by the end fitting $g$, the layers $c$ and $b$, the electrolyte flowing in the pipe 2', the layer $a'$, the end fitting $f'$ and the conductor wire 3 constitute an interference circuit discharging a leakage current generated by the two half-elements thus short-circuited. Of course, that leakage current can be reduced by providing a sufficiently great length of pipe 2' with a view to increasing the ohmic resistance of the interference circuit.

However, at the level of the end limited by the zones A and B of the element 1, two paths are open simultaneously to the transfer of the electric charges, that is, to the current flowing in the interference circuit.

The first method of transfer consists in the moving of the OH— ions from the layer c where they are formed, to the electrolyte, crossing the layers b and a, then moving under the effect of the electric field in the pipe 2';

The second method of transfer consists in the moving of the OH- ions from the layer c where they are formed to the metallic collector a, for example in the zone A; at that level, each OH— ion can supply, in contact with a particle of zinc in the suspension, a zincate ion and an electron; that last charge transits, in the end piece f and, having reached the zone B, substantially supplies, with a zincate ion of the solution, a particle of zinc on the one hand and an OH- ion on the other hand, which, moving along in the pipe 2', will become discharged on coming into contact with the end fitting f'. It can therefore be seen that progressively, a zinc deposit will be effected on the internal wall of the said end fitting and will grow according to the electric field in the pipe 2' and, when such a deposit reaches the end fitting f', the element 1 is clearly short-circuited.

To avoid such a detrimental effect, according to the invention, an insulating coating 4 is provided on the internal face of the end fitting f, so that the transformation described in the zone B may not take place, thus preventing the second transfer method.

Such a coating 4 can be a plastic tube or cap fitted or cemented into the end fitting f or else a layer of insulating varnish or the like.

It must be understood that such a coating 4' will also be arranged at the output of the element 1', itself connected to an element (not shown), but it will not be necessary to provide it inside the end piece f', on the input side of the said element 1'.

It has been assumed in the said description that this concerns an electrochemical cell in which zinc is used. Of course, zinc can be replaced by any metal suitable for forming, by discharge, products which are soluble in the electrolyte, without forasmuch going beyond the scope of the invention.

Likewise, it has been assumed that the elements have a tubular shape, but it is quite evident that the invention can easily be transposed by the man in the art to any form of elements and more particularly to elements having a plane shape.

It must be understood that the invention is in no way limited to the embodiment described and illustrated, which has been given only by way of an example.

More particularly, without going beyond the scope of the invention, details can be modified, certain arrangements can be changed or certain means can be replaced by equivalent means.

I claim:

1. In an electrochemical storage cell comprising a plurality of elementary cells each having negative and positive terminals at either end of the cell and being of the type in which an alkaline electrolyte including in suspension a metal suitable for supplying on discharge of the cell a compound soluble in the electrolyte is made to flow within the elementary cells, said elementary cells each having a negative collector grid in contact with said electrolyte, a catalytic active layer and a positive collector grid, said negative and positive collector grids being connected to said negative and positive terminals, respectively, the method of connecting said plurality of elementary cells in series to form said storage cell comprising the steps of
hydraulically feeding each of said elementary cells in series with said electrolyte,
electrically connecting said elementary cells in series, and
electrically insulating the negative terminal of each elementary cell located hydraulically the nearest to the following elementary cell having a higher potential so that the interference transfer of charges resulting from connecting said elementary cells in series can be effected only by ionic conduction in the electrolyte flowing between said elementary cells.

2. An electrochemical storage cell comprising:
a plurality of elementary cells each having negative and positive terminals at either end of the cell and being of the type in which an alkaline electrolyte including in suspension a metal for supplying on discharge of the cell a compound soluble in the electrolyte is made to flow within the elementary cells, said elementary cells each having a negative collector grid in contact with said electrolyte, a catalytic active layer and a positive collector grid, said negative and positive collector grids being connected to said negative and positive terminals, respectively,
means for hydraulically feeding each of said elementary cells in series with said electrolyte,
means connected to said negative and positive terminals for electrically connecting said elementary cells in series, and
insulating means on the negative terminal of each elementary cell located hydraulically the nearest to the following elementary cell having a higher potential for electrically insulating said negative terminal from said electrolyte so that the interference transfer of charges resulting from connecting said elementary cells in series can be effected only by ionic conduction in the electrolyte flowing between said elementary cells.

3. An electrochemical storage cell as recited in claim 2 wherein said electrolyte comprises potassium hydroxide solution and said metal in suspension comprises powdered zinc.

4. An electrochemical storage cell as recited in claim 3 wherein said insulating means consists of a layer of varnish.

5. An electrochemical storage cell as recited in claim 3 wherein each of said plurality of elementary cells are tubular and said negative and positive terminals are cylindrical and concentric, said negative terminals being disposed within said positive terminals with said means for hydraulically feeding being a series of conduits connected over the outer surfaces of adjacent ones of said negative electrodes, and said insulating means consists of a tube made of a plastic material.

* * * * *